(12) United States Patent
Jarosz

(10) Patent No.: US 07,000,121 B2
(45) Date of Patent: Feb. 14, 2006

(54) COMPUTER SYSTEMS, IN PARTICULAR VIRTUAL PRIVATE NETWORKS

(75) Inventor: Mark Joseph Stefan Jarosz, Bristol (GB)

(73) Assignee: Fujitsu Services Limited, Slough (GB)

( * ) Notice: Subject to any disclaimer, the term of this patent is extended or adjusted under 35 U.S.C. 154(b) by 922 days.

(21) Appl. No.: 09/862,860

(22) Filed: May 22, 2001

(65) Prior Publication Data

US 2001/0054158 A1 Dec. 20, 2001

(30) Foreign Application Priority Data

Jun. 15, 2000 (GB) .............................................. 0014523

(51) Int. Cl.
*G06F 17/00* (2006.01)

(52) U.S. Cl. ....................... 713/201; 713/171; 713/153; 713/151; 713/152

(58) Field of Classification Search ......... 713/200–202, 713/150–153, 168–172; 709/225, 229, 226
See application file for complete search history.

(56) References Cited

U.S. PATENT DOCUMENTS

| | | | | |
|---|---|---|---|---|
| 5,917,900 | A | * | 6/1999 | Allison et al. .............. 379/229 |
| 6,473,863 | B1 | | 10/2002 | Genty |
| 6,732,179 | B1 | * | 5/2004 | Brown et al. ............... 709/229 |
| 6,735,631 | B1 | * | 5/2004 | Oehrke et al. .............. 709/226 |

FOREIGN PATENT DOCUMENTS

| | | |
|---|---|---|
| GB | 2 028 062 | 2/1980 |
| GB | 2 289 394 | 11/1995 |
| GB | 2 328 352 | 2/1999 |
| GB | 2 340 702 | 2/2000 |
| WO | WO 96/21981 | 7/1996 |

OTHER PUBLICATIONS

"Undernet IRC Servers", Sep. 2, 1996, [Retrieved from Internet Sep. 17, 2004], "http://www.blennow.se/newbplus/unetserv.html".*
Panicker, "An Improved Scheme For Self–Healing in ATM Networks", Computer Communications, vol. 22, No. 15–16, Sep. 25, 1999, pp 1400–1414.

* cited by examiner

Primary Examiner—David Jung
(74) Attorney, Agent, or Firm—Barnes & Thornburg, LLP

(57) ABSTRACT

A first node (client) (1) is in communication with one of a plurality of second nodes (5, 6, 7) connected to a local area network (LAN) (4) via a virtual private network including a link (3), such as the Internet, and a selected one of a plurality of third nodes (gateway servers) (21, 22, 23). Communication between the first node (1) and the third nodes (21, 22, 23) is encrypted, whereas communication between the third nodes and the second nodes (5, 6, 7) is unencrypted. Communication from the first node (1) to one of the second nodes (5, 6, 7) is initially set up via a selected one of the third nodes after suitable authentication. If that third node should subsequently fail, an alternative third node can be used. To detect the failure of a third node, the first node (1) sends a "heartbeat" packet (failure detection signal) to it. An operational third node responds with an answer, indicating that all is well. If no answer is received within a predetermined time interval, the first node sends another "heartbeat" packet. If there is still no answer, another third node is selected for use. This other third node can be one that was previously authenticated, or alternatively one that must be authenticated at this time. In order to reduce workload heartbeat messages may only be sent at selected times.

7 Claims, 2 Drawing Sheets

COMPUTER SYSTEMS, IN PARTICULAR VIRTUAL PRIVATE NETWORKS

BACKGROUND OF THE INVENTION

This invention relates to computer systems, in particular virtual private networks (VPNs) and especially to a resilient implementation of a VPN.

A VPN is a connection between two "sites" that has the appearance of a dedicated link but which occurs over a shared network, such as the Internet or a direct RAS (Remote Access Service) dial-in connection. Using a technique known as "tunnelling", data packets are transmitted over the shared network in a private "tunnel" between the sites. Tunnelling is the encapsulation of a data packet, for example an IP (Internet Protocol) packet inside another IP packet, after encrypting the data packet. The outer packet has a different destination IP address from the inner one and is used to direct the inner encrypted packet to a VPN security gateway at a site, where the outer layer can be stripped off, the inner packet decrypted and sent to the appropriate one of a number of destinations within the site. If this gateway should fail, no connection to these destinations is possible.

It is an object of the invention to provide means which ensure that full or partial failure of a gateway (for example failure of either one or both of the interfaces onto its connected networks) does not result in such a lack of connection.

SUMMARY OF THE INVENTION

According to one aspect of the invention there is provided a computer system comprising a first node connectable to a second node via one of a plurality of third nodes, communications between the first node and the respective third node being encrypted, and further comprising means for selecting a said third node and setting up an encrypted connection between the first node and the selected third node, means for detecting subsequent failure of the selected third node, and means for selecting another third node and setting up an encrypted connection between the first node and the other selected third node, wherein the first node and the plurality of third nodes form a virtual private network in which communications between the first node and each of the third nodes is encrypted with a respective message encryption key established after an authentication process, wherein the means for selecting the third node comprises a key management service which selects a third node from the plurality and attempts to perform a said authentication process therewith upon a request by the first node for a said message encryption key, and wherein upon successful authentication the said message encryption key is generated and cached at the first node and the selected third node.

According to another aspect of the invention there is provided a method of detecting node failure, and connecting to another node, in a computer system comprising a first node connected to a second node via one of a plurality of third nodes, communications between the first node and the one said third node being encrypted, the method being employed for detecting failure of the one said third node, after authentication and connection of the first node thereto, and for establishing connection of the first node to another of said third nodes, and including steps wherein the first node sends a failure detection signal to the one said third node at a predetermined time, wherein if the one said third node is operational it sends a response to the failure detection signal to the first node, and wherein in the event of the receipt of no said response within a predetermined time interval the first node either establishes a connection with another said third node which was previously authenticated, or attempts to authenticate another said third node and establish connection therewith, and wherein the first node and the plurality of third nodes form a virtual private network in which communications between the first node and each of the third nodes is encrypted with a respective message encryption key, and the method includes the step of establishing a respective message encryption key after each said authentication.

BRIEF DESCRIPTION OF THE DRAWINGS

Embodiments of the invention will now be described with reference to the accompanying drawings, in which.

SPECIFIC DESCRIPTION INCLUDING DESCRIPTION OF PREFERRED EMBODIMENTS

Figure 1:
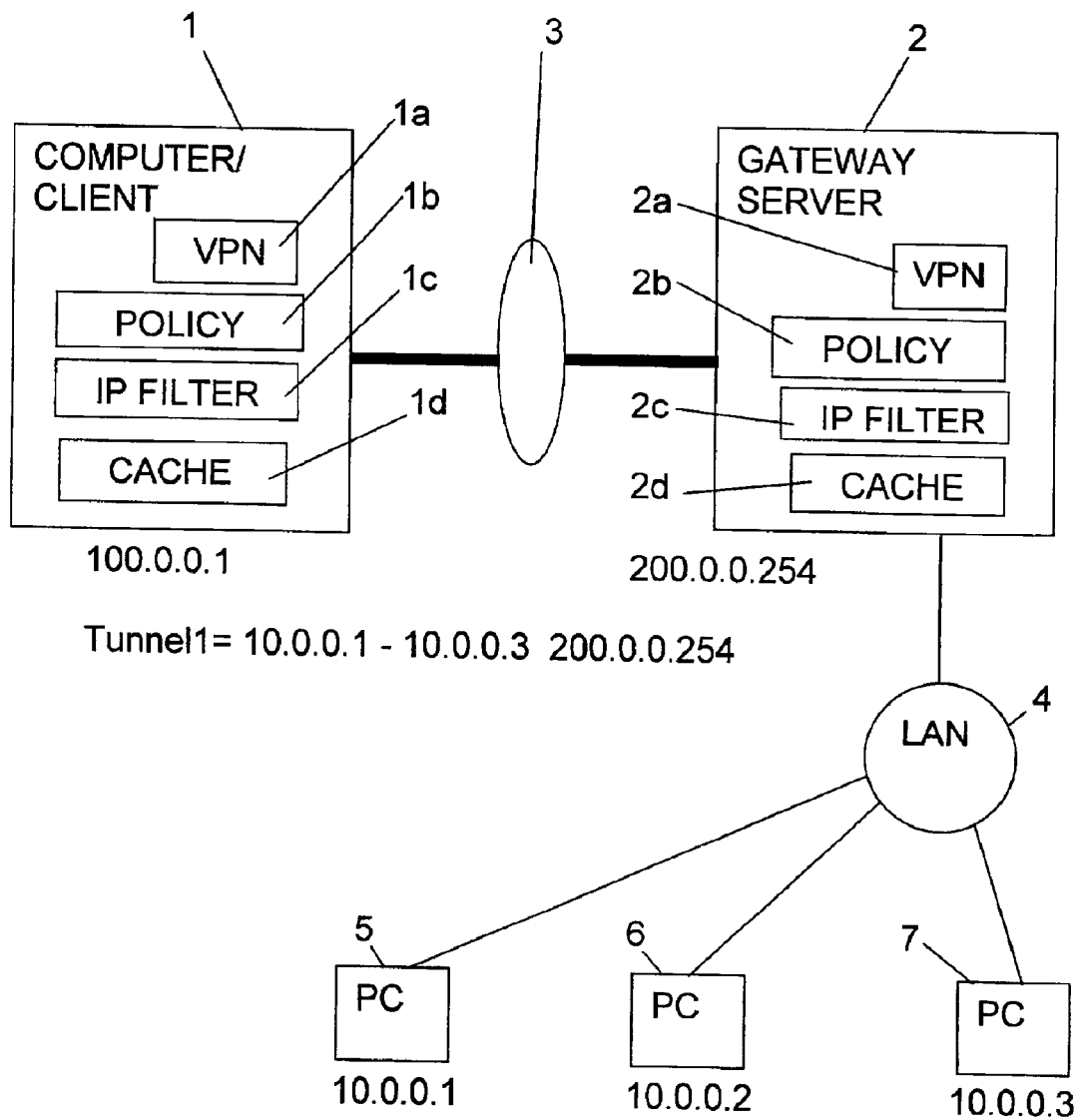
FIG. 1 illustrates an example embodiment of a conventional VPN network (prior art)
Figure 2:
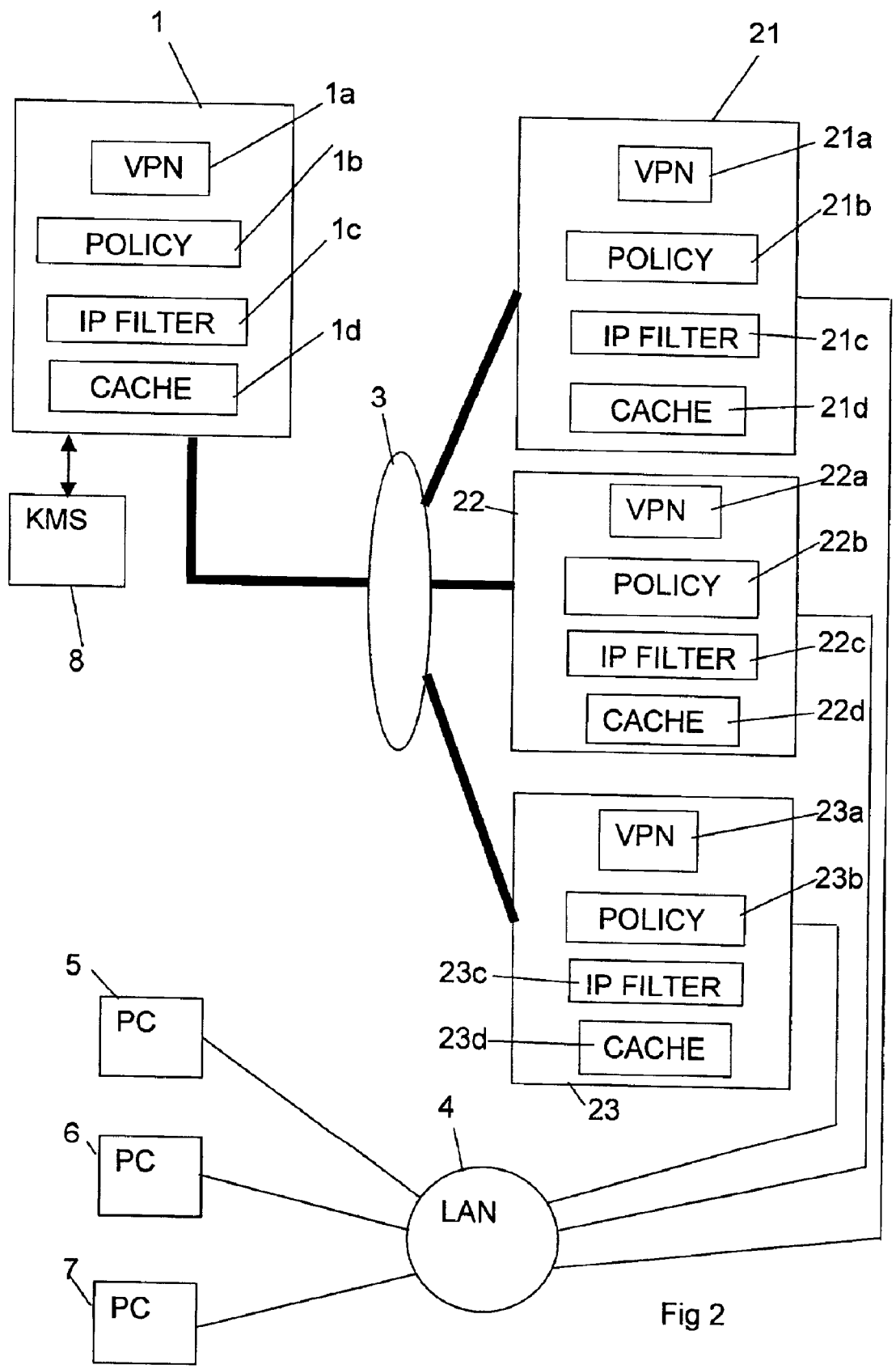
FIG. 2 illustrates, schematically, an embodiment of the present invention.

In FIG. (prior art) two computers (nodes) 1, 2 are connected by a communications link 3 comprised for example by a direct RAS dial-in connection or the Internet. The computers 1 and 2 are provided with the appropriate VPN software 1a, 2a so that communications therebetween over link 3 are encrypted, indeed computers 1, 2 and link 3 may be considered to form an encrypted network. The computer 2 is connected via a LAN 4 to three computers (nodes) 5, 6 and 7 which may be personal computers (PCs). Communications between the computers 2, 5, 6 and 7 over LAN 4 are not encrypted. In FIGS. 1 and 2, encrypted communication is indicated by a thicker line than unencrypted communication. The computer 2 comprises a gateway server which links the encrypted and unencrypted networks. The computers 5, 6 and 7, which may be referred to as target machines, each have a respective IP address, indicated in the drawing as 10.0.0.1, 10.0.0.2 and 10.0.0.3, respectively. The computer 1, which may be a notebook computer, and may be referred to as a client, has an IP address indicated in the drawing as 100.0.0.1, whereas the gateway server 2 has an IP address indicated in the drawing as 200.0.0.254. The policy 1b of the client 1 includes a tunnel setting that indicates for the gateway server 2 which target machines, or rather their IP addresses, are located behind the gateway server 2. The policy can also include tunnel settings for other gateway server/target machines. The tunnel setting for the illustrated arrangement is as indicated in the drawing (Tunnel 1). The arrangement of FIG. 1 can employ the software product designated SafeGuard VPN from Utimaco Safeware AG to encrypt the data transfer. In the case of use of SafeGuard VPN and if the tunnel setting applies, GSS (Generic Security Services) key exchange is employed between the client 1 and the gateway 2, instead of between the client 1 and one of the target machines 5, 6, 7. The client and server include IP filters 1c, 2c for extracting data intended for them, or in the case of a gateway server for each target IP address behind it e.g. 10.0.0.1–10.0.0.3. In the IP filter for each target address behind gateway 2, a session key for that gateway is used for encryption. The session key is stored in caches 1d and 2d.

In the case of data to be sent from the client machine 1 to the target machine 5, a data packet with a sender address 100.0.0.1 and a receiver address 10.0.0.1 will be encrypted at the client machine 1 and transmitted in another packet, with the sender address 100.0.0.1 but a receiver address 200.0.0.254, to the gateway server 2, where the outer layer is removed, the inner packet decrypted and sent on to target machine 5 unencrypted.

Only one gateway is specified for a given range of IP addresses i.e. target machines. Hence, if gateway 2 fails, no further communication with the LAN 4 behind gateway 2 is possible, unless there is a second gateway (not shown) installed and the policy of the client machine is reconfigured accordingly.

In the case of a second gateway being available, the client 1 has to be able to find a new path behind the gateways at run time without the need for manual reconfiguration. There are two points which have to be considered in order to obtain a fault tolerant system. Firstly, the complete GSS key exchange and session key establishment has to take place with one and the same gateway, it cannot start with one and finish with another, and whilst it is relatively easy to specify a list of gateways in the client's policy 1b that are to be tried one after the other until successful session key establishment, failure of a gateway has to be detected somehow after a session has already been established.

The present invention employs re-authentication to achieve gateway fault tolerance. More than one gateway (node) is defined for a given range of IP addresses. This is referred to as a gateway cluster. In FIG. 2 there is shown a cluster of three gateways (nodes) 21, 22, 23. When a session key request is issued by client 1 for an IP address in this given range, means such as a key management service KMS 8 randomly selects one gateway from the cluster, such as 21, and attempts authentication, such as by means of establishing a connection with the chosen gateway and carrying out a key establishment protocol exchange. If the authentication fails, authentication is attempted with the next specified gateway, such as 22, in a round-robin manner. If authentication with all of the gateways 21–23 fails, the key request is rejected.

If authentication is successful, however, the session key generated for that gateway, such as 21, is passed back to the client IP filter 1c and cached both at the client and at the gateway in caches 21d, 1d, respectively, thereby permitting data to be transmitted between the client and gateway and encrypted/decrypted at both. A different session key will be associated with each gateway, so that if data is sent from client 1 to target machine 5, via gateway server 21, but an answer from target machine 5 to client 1 runs over a different gateway server 22, a new session and another session key will need to be established for that gateway/client connection.

To detect failure of a gateway, such as 21, following establishment of a session for the particular client 1 gateway connection (client 1/gateway 21) the client IP filter 1c transmits a failure detection signal, comprising so-called "heartbeat" packets to the gateway 21, or rather the gateway's IP filter 21c which is required to respond to it with an answer. If an answer to such a packet does not arrive at the client IP filter 1c within a predetermined time, such as n seconds, this being configurable, a second failure detection signal is sent by the client IP filter 1c. If there is still no answer, the client IP filter 1c searches to see if there is already a session key established for some other gateway in the cluster to which the defective gateway belongs. If there is already such a key established for another gateway, client IP filter 1c automatically makes use of this other gateway, say 22, instead of the defective one. The session key of the defective gateway 21 is removed from the cache 1d at the client 1. If there is no such established key for another gateway in the cluster, the client IP filter 1c issues a key request to the key management service 8 for some other gateway in the cluster. If this key request fails but the key management service succeeds in the authentication process with another gateway in the cluster, it simply sets the appropriate key and the client IP filter 1c will use it from then on.

To reduce the workload for the gateway, "heartbeat" messages are only sent if there has been a session key established but no packet from this gateway has been received for the last n seconds. As long as there are packets received from the gateway within the above time interval, the gateway is considered to be operational. If the client IP filter has session keys established for more than one gateway in a cluster, heartbeat messages are only sent to the gateway that was being used for communications emanating from the client.

A further reduction of workload, especially for RAS environments can be achieved by configuring the heartbeat as "deferred", that is the sending out of the heartbeat packet on the client side is deferred until the client has to send IP (payload) packets to the respective gateway anyway. This behaviour prevents any unnecessary connection establishments between the client and the gateway in previously idle times. However, in case of failure of the respective gateway, a certain number of IP payload packets get lost and connection recovery takes longer than otherwise necessary. Both heartbeat modes, instant and deferred, are configurable by a setting in the client's policy 1b.

Heartbeat messages are encapsulated in the same way as normal communication is configured. This is necessary to allow the packets to be delivered over the same route, for example through a firewall that is configured to let only encrypted packets pass. In the particular case where the "tunnels" are created according to RFC1827, then since at least an ESP (Encapsulating Security Payload) is used in every mode, the heartbeat packet will be detected by having an SPI (Security Parameter Index) of Ox FFF FFFFF. The gateway IP filter will respond to every packet containing such an SPI with an equal packet in the opposite direction. The packet is never decrypted and contains no useful information. Simply the SPI is evaluated.

This solution causes a lot of re-authentication at the remaining gateways, if one fails. To distribute the authentication load, in case of a failure, the key management service KMS 8 randomnizes the order of the specified cluster gateways each time it reads it from the policy file 1b and before it passes it to the client IP filter 1c. The client filter 1c itself will search the gateways in a cluster in sequential order.

This randomnization will cause a distributed load on the gateways, even if all clients connectable in a particular VPN happen to have identical policies. The randomization of the cluster members may be turned off via a policy setting in cases where a specific order is desired, for example high performance main and low performance backup systems.

If a defective gateway is re-actuated, it will automatically be used once any client initiates an authentication and tries that gateway because it is the next on the list. On the other hand, if communication starts from the gateway, it will establish a new session key with the client, and therefore cause the client to use that gateway again. In particular if the re-actuated gateway is the client's preferred gateway, then the client will start using the gateway once the session key with the gateway is established.

Various aspects of the above will now be described in greater detail. The VPN software as loaded on the clients such as 1 and gateways such as 21, 22, 23 (FIG. 2), as indicated at 1a, 21a, 22a, 23a, makes it possible to specify a single tunnel address for a single IP address or a range of addresses. Alternatively instead of a tunnel address, a named Cluster may be defined for a single IP address or range of IP addresses. A named Cluster is defined in the policy within an additional section named CLUSTER. A new statement is supported, consisting of a new keyword (named "cluster") and one or more IP addresses separated by at least one blank. For example,

[CLUSTER]
Cluster 1=143.1.0.64 143.1.1.157
Cluster 2=143.1.0.63 143.1.0.65 143.1.0.66

The supported syntax of a Policy entry in the new "CLUSTER" section has to be written in the following format:

'cluster'<nr>'='<IP address>["<IP address>]

Whenever a communication partner (target) is located behind a Gateway Cluster which performs the actual authentication and/or encryption/decryption tasks, the key management service process needs to know the addresses of each possible tunnel of the gateway cluster. If there is only one gateway a tunnel entry can be specified in the usual manner, although a cluster can be defined and then added to the tunnel entry, but if there are two or more gateways, the cluster must be defined and the appropriate cluster added to the tunnel entry instead of a single tunnel address.

The syntax for a single tunnel entry is as follows:

'Tunnel'<nr>'='<start address>['-'<end address>]"(<tunnel address>|'Cluster'<nr>|'AUTO')

The following example of possible policy entries, using the above examples, will clarify the syntax.

[TUNNEL]
Tunnel1=143.1.0.24–143.1.0.30 Cluster 1
(This means that from the IP address 143.1.0.24 to the IP address 143.1.0.30, every IP address is "tunnelled" by the Cluster 1, thus either gateway 143.1.0.64 or gateway 143.1.1.157 is used to perform the actual authentication and/or encryption/decryption tasks.)
Tunnel2=143.1.0.24–143.1.0.30 143.1.1.160
(This is also a valid entry which means gateway 143.1.1.160 is used to perform the actual authentication and/or encryption/decryption tasks.)

An automatically detected RAS server address may be redirected to an address or a gateway cluster by the following entry in the tunnel section:

'Redirect Tunnel'<nr>'='<server address>"(<tunnel address>|'Cluster'<nr>)

To distribute the workload, the key management service randomizes the order of the specified gateway addresses for all tunnel entries each time it reads it from the policy and before it passes it to the client IP filter.

To detect the failure of a gateway, the client IP filter sends "heartbeat" packets to the gateway for response by the gateway's IP filter. If the answer to such a packet does not arrive within n seconds, a second packet is sent. To configure this "response time", a statement in the GENERAL section of the policy is required:

'HeartbeatResponseTime''='<number of seconds>

If there is no such entry, the default value of the client IP filter is used.

To reduce workload for the gateway, "heartbeat" messages may only be sent if there has been a session key established and no packet from the gateway has been received for the last n seconds. As long as there are packets received from the gateway within the above time interval, the gateway is considered to be operational. If the client filter has session keys established for more than one gateway in a cluster, heartbeat messages are only sent to the gateway that would be being used for communications emanating from the client. To support this functionality there is another new entry in the GENERAL section of the policy:

'HeartbeatDeferTime''='<number of seconds>

If there is no such entry, the default value of the client IP-filter is used.

In order to disable the heartbeat functionality, a further new policy entry in the GENERAL section is required:

'Heartbeat'`='(NONE|DEFERRED|INSTANT)

Heartbeat=NONE disables the heartbeat functionality i.e. no heartbeat packets are sent.

Heartbeat=DEFERRED defers the sending out of heartbeat packets on the client's side until the client has sent out IP packets to the respective gateway.

Heartbeat=INSTANT the client IP filter sends heartbeat packets to the gateway without any deferment.

By default, no heartbeat packets are sent.

In summary, the invention provides means or steps for enabling a computer system to continue to connect a first node to a second node via one of a plurality of third nodes, communications between the first and third nodes being encrypted, when the third node fails in use. Failure detection messages are sent and if they are not responded to at the appropriate time, another third node is selected for use. If the latter has not already been authenticated i.e. it is not in a suitable state for encrypted communication, it will first need to be authenticated, and, for example, a respective message encryption key established.

What is claimed is:

1. A method of operating a computer system comprising a first node connectable to a second node by way of any of a plurality of gateway nodes, wherein:
   (a) the first node initially establishes a first virtual private network (VPN) connection with the second node by way of one of the gateway nodes, using a session key which is held in a cache store in the first node to encrypt communications between the first node and said one of the gateway nodes;
   (b) the first node monitors said one of the gateway nodes for failure;
   (c) in the event of failure of said one of the gateway nodes, the first node deletes the session key from the cache store and searches the cache store to determine whether another session key has been cached allowing a new VPN connection to be established with the second node by way of another of the gateway nodes;
   (d) in the event that another session key has not been cached, the first node initiates a key establishment protocol exchange with a selected one of the gateway nodes, other than the failed node, to establish a new session key allowing a new VPN connection to be established with the second node by way of said selected one of the gateway nodes, the new session key being saved in the cache store.

2. A method according to claim 1, wherein said selected one of the gateway nodes is chosen randomly from the plurality of gateway nodes.

3. A method according to claim 1, wherein the first node monitors said one of the gateway nodes for failure by periodically sending a failure detection signal to said one of the gateway nodes and determining whether a response to the failure detection signal is received from said one of the gateway nodes within a predetermined time.

4. A method according to claim 3, the failure detection signal is transmitted when a respective message encryption key has been established and no communication from the selected one of the gateway nodes has been received by the first node within a predetermined time interval.

5. A method according to claim 3, wherein transmission of the failure detection signal is deferred until after the first node has transmitted encrypted communications to the selected one of the gateway nodes.

6. A method according to claim 3, wherein the failure detection signal is transmitted as an encrypted packet.

7. A computer system comprising a first node connectable to a second node by way of any of a plurality of gateway nodes, wherein the first node comprises:

(a) a cache store for storing session keys;

(b) means for establishing a first virtual private network (VPN) connection with the second node by way of one of the gateway nodes, using a session key held in the cache store to encrypt communications between the first node and said one of the gateway nodes;

(c) means for monitoring said one of the gateway nodes for failure;

(d) means operative in the event of failure of said one of the gateway nodes, for deleting the session key from the cache store and searching the cache store to determine whether another session key has been cached allowing a new VPN connection to be established with the second node by way of another of the gateway nodes;

(e) means operative in the event that another session key has not been cached, for initiating a key establishment protocol exchange with a selected one of the gateway nodes, other than the failed node, to establish a new session key allowing a new VPN connection to be established with the second node by way of said selected one of the gateway nodes, and for saving the new session key in the cache store.

\* \* \* \* \*